(12) United States Patent
Yokota

(10) Patent No.: US 8,223,093 B2
(45) Date of Patent: Jul. 17, 2012

(54) ELECTRO-OPTICAL DEVICE, ELECTRONIC APPARATUS, AND PROJECTION DISPLAY

(75) Inventor: Tomoki Yokota, Chino (JP)

(73) Assignee: Seiko Epson Corporation, Tokyo (JP)

( * ) Notice: Subject to any disclaimer, the term of this patent is extended or adjusted under 35 U.S.C. 154(b) by 522 days.

(21) Appl. No.: 12/549,587

(22) Filed: Aug. 28, 2009

(65) Prior Publication Data

US 2010/0085281 A1    Apr. 8, 2010

(30) Foreign Application Priority Data

Oct. 3, 2008 (JP) ................................. 2008-258122

(51) Int. Cl.
*G09G 3/30* (2006.01)
(52) U.S. Cl. ............ 345/76; 345/205; 345/100; 345/87; 345/89; 345/90
(58) Field of Classification Search ........................ None
See application file for complete search history.

(56) References Cited

U.S. PATENT DOCUMENTS

| 6,767,755 | B2 * | 7/2004 | Yamanaka et al. | 438/30 |
| 7,432,889 | B2 * | 10/2008 | Yumoto | 345/77 |
| 2007/0085818 | A1 * | 4/2007 | Amundson et al. | 345/102 |

FOREIGN PATENT DOCUMENTS

| JP | 2003-287764 A | 10/2003 |
| JP | 2006-003920 A | 1/2006 |

* cited by examiner

*Primary Examiner* — Muhammad N Edun
(74) *Attorney, Agent, or Firm* — Lowe, Hauptman, Ham & Berner, LLP

(57) ABSTRACT

An electro-optical device includes an element substrate having a first signal line; a second signal line extending in a second direction crossing the first signal line; a first field-effect transistor including a first semiconductor layer extending in a direction crossing the second direction; a second field-effect transistor including a second semiconductor layer extending in the direction crossing the second direction; a first pixel electrode is adjacent to a second pixel electrode. The first semiconductor layer and the second semiconductor layer are displaced from each other in the second direction. An end of the first semiconductor layer facing toward the second pixel electrode is closer to the second pixel electrode than an end of the second semiconductor layer facing toward the first pixel electrode.

9 Claims, 7 Drawing Sheets

ELECTRO-OPTICAL DEVICE, ELECTRONIC APPARATUS, AND PROJECTION DISPLAY

RELATED APPLICATIONS

The present application is based on, and claims priority from, Japanese Application Number 2008-258122, filed Oct. 3, 2008, the disclosure of which is hereby incorporated by reference herein in its entirety.

BACKGROUND

1. Technical Field

The present invention relates to electro-optical devices including an element substrate on which pixels are arranged and electronic apparatuses and projection displays including such electro-optical devices.

2. Related Art

Among various electro-optical devices, a liquid crystal device includes a liquid crystal layer between an element substrate and a counter substrate and has pixels at positions corresponding to intersections of data lines and scanning lines on the element substrate. Each pixel includes a field-effect transistor for pixel switching and a pixel electrode electrically connected to the field-effect transistor.

In the liquid crystal device thus configured, the field-effect transistor is disposed at a position where the field-effect transistor overlaps the pixel electrode of the pixel to which the transistor belongs or at a position where the field-effect transistor overlaps a signal line beside the pixel to which the transistor belongs. Hence, the pitch of the pixels agrees with that of the field-effect transistors and is inevitably larger than the length of semiconductor layer constituting the field-effect transistor (see JP-A-2003-287764 and JP-A-2006-3920).

For the above electro-optical device, if the pixel pitch is reduced in order to increase image resolution, the length of the semiconductor layer constituting the field-effect transistor must be reduced accordingly because the pixel pitch is inevitably larger than the length of the semiconductor layer. This makes it difficult to reduce the pixel pitch any further because problems such as a decrease in the source-drain breakdown voltage of the field-effect transistor may occur.

SUMMARY

An advantage of some aspects of the invention is that it provides an electro-optical device whose pixel pitch can be reduced without reducing the size of field-effect transistor provided in each pixel and also provides an electronic apparatus and a projection display including such an electro-optical device.

An electro-optical device according to an aspect of the invention includes an element substrate having a first signal line extending in a first direction; a second signal line extending in a second direction crossing the first direction; a first pixel electrode electrically connected to the first signal line; a second pixel electrode electrically connected to the first signal line and adjacent to the first pixel electrode; a first field-effect transistor electrically connecting the first pixel electrode to the first signal line; and a second field-effect transistor electrically connecting the second pixel electrode to the first signal line. The first field-effect transistor includes a first semiconductor layer extending in a direction crossing the second direction. The second field-effect transistor includes a second semiconductor layer extending in the direction crossing the second direction. The first semiconductor layer and the second semiconductor layer are displaced from each other in the second direction. An end of the first semiconductor layer facing toward the second pixel electrode is adjacent to an end of the second semiconductor layer facing toward the first pixel electrode or is closer to the second pixel electrode than the end of the second semiconductor layer facing toward the first pixel electrode.

The first pixel and the second pixel are adjacent to each other in the first direction. The first semiconductor layer constitutes the first field-effect transistor, and the second semiconductor layer constitutes the second field-effect transistor. The first semiconductor layer and the second field-effect transistor are displaced from each other in the second direction. This allows the first and the second semiconductor layers to be extended so that the end of the first semiconductor layer facing toward the second pixel electrode is adjacent to the end of the second semiconductor layer facing toward the first pixel electrode, or the end of the first semiconductor layer facing the second pixel electrode is closer to the second pixel electrode than the end of the second semiconductor layer facing toward the first pixel electrode. As a result, the end of the second semiconductor layer facing toward the first pixel electrode is adjacent to the end of the first semiconductor layer facing toward the second pixel electrode, or the end of the second semiconductor layer facing toward the first pixel electrode is closer to the first pixel electrode than the end of the first semiconductor layer facing toward the second pixel electrode. Accordingly, even if the pixel pitch is reduced, problems such as a decrease in the source-drain breakdown voltage of the first and the second field-effect transistors do not occur. The pixel pitch can therefore be reduced without degrading the characteristics of the field-effect transistors to, for example, increase image resolution.

The above aspect of the invention is particularly effective if the length of the first semiconductor layer in the first direction and the length of the second semiconductor layer in the first direction are larger than the pitch of the first and the second pixel electrodes.

In the above aspect of the invention, the first semiconductor layer may extend from a position where the first semiconductor layer overlaps the first pixel electrode in plan view to a position where the first semiconductor layer overlaps the second pixel electrode in plan view, and the second semiconductor layer may extend from a position where the second semiconductor layer overlaps the second pixel electrode in plan view to a position where the second semiconductor layer overlaps the first pixel electrode in plan view. This allows the first and the second semiconductor layers to be extended to the maximum extent possible. Accordingly, even if the pixel pitch is reduced, problems such as a decrease in the source-drain breakdown voltage of the first and the second field-effect transistors do not occur.

In the above aspect of the invention, preferably, the first semiconductor layer is symmetrical with the second semiconductor layer about a position between the first and the second pixel electrodes, and the first pixel electrode is symmetrical with the second pixel electrode about a position between the first and the second pixel electrodes. This allows easy pixel design and effective utilization of arrangement spaces in the first and the second pixels to the maximum extent possible.

In the above aspect of the invention, preferably, a plurality of pixel electrode pairs, each of the pixel electrode pairs including the first and the second pixel electrodes are arranged both in the first direction and in the second direction. This allows the pixels to be easily designed so that the pixel pitch is reduced over an entire region where the pixels are arranged.

The electro-optical device according to the above aspect of the invention may be configured as a liquid crystal device. In this case, the liquid crystal device includes a counter substrate disposed opposite the element substrate and a liquid crystal layer held between the element substrate and the counter substrate.

In this case, preferably, the first and the second pixel electrodes are formed of reflective conductive films. If the electro-optical device is a reflective liquid crystal device, the pixel aperture rate (the proportion of the area where display light can be emitted in the pixels) is not decreased even if the field-effect transistors are disposed in regions where they overlap the pixel electrodes. Accordingly, the pixel aperture rate is not decreased even if the field-effect transistors are made longer in the first and the second pixels, thus providing a bright display.

The electro-optical device according to the above aspect of the invention may be used as a viewing display for an electronic apparatus such as a cellular phone or a mobile computer. In addition, the electro-optical device according to the above aspect of the invention may be used as a light valve for a projection display (electronic apparatus). In this case, the projection display includes a light source that supplies light for the electro-optical device and a projection optical system that projects light modulated by the electro-optical device onto a target surface. Reducing the pixel pitch for increased image resolution is particularly effective for the projection display system because the light coming from the pixels is projected as a magnified image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
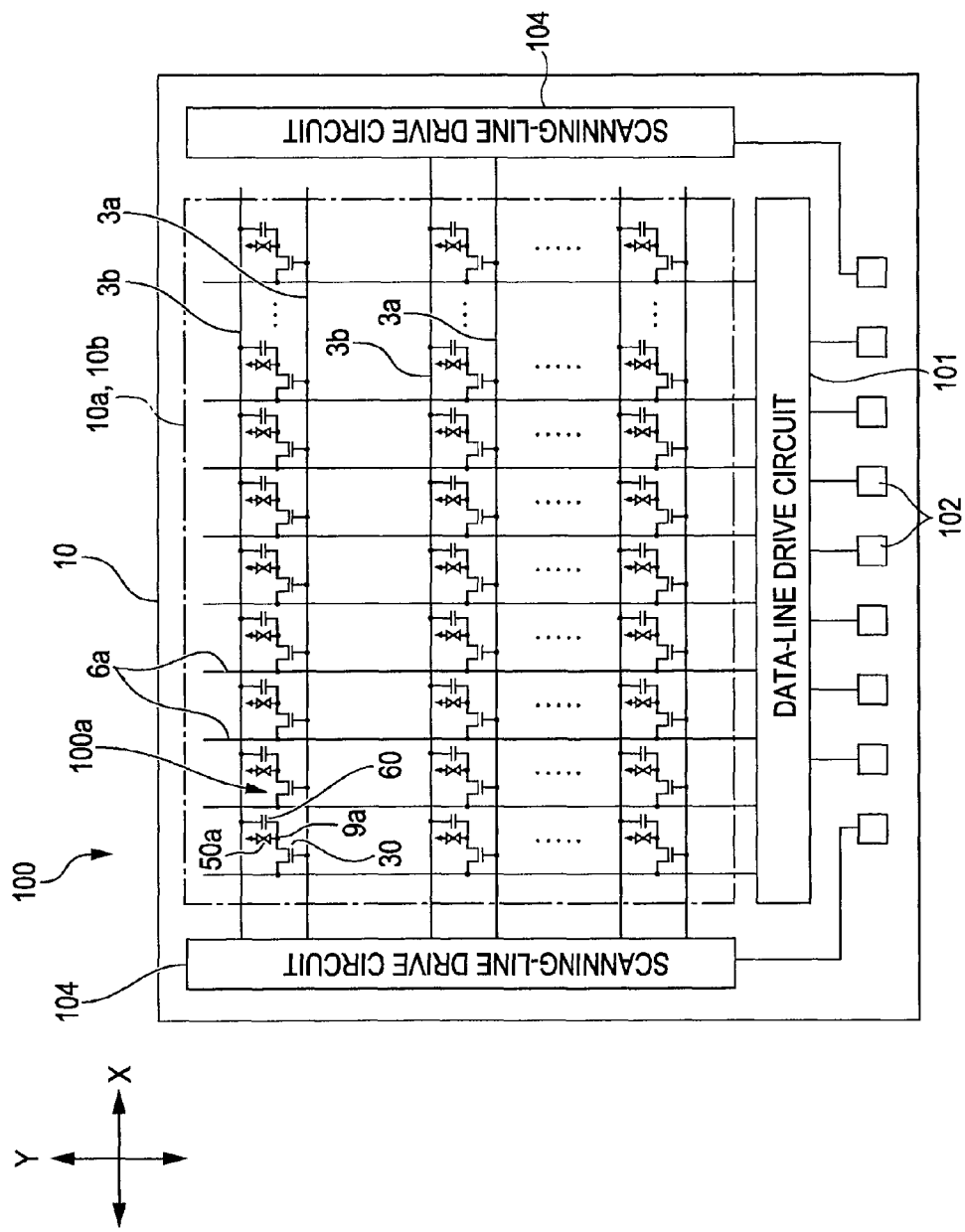
FIG. 1 is a block diagram showing the electrical configuration of an electro-optical device according to an embodiment of the invention.

Embodiments of the invention will now be described with reference to the drawings, where individual layers and members are shown with different scales so that they are large enough to be visible in the drawings. The source and drain of a field-effect transistor change places if the direction in which a current flows therethrough is reversed; in the description below, for illustrative purposes, the side to which a pixel electrode is connected is referred to as the drain, whereas the side to which a data line is connected is referred to as the source.

Structure of Electro-Optical Device
Overall Structure

FIG. 1 is a block diagram showing the electrical configuration of an electro-optical device according to an embodiment of the invention. As shown in FIG. 1, an electro-optical device 100 includes a liquid crystal panel having, in a central region thereof, a pixel array region 10b in which a plurality of pixels 100a are arranged in a matrix. The liquid crystal panel includes an element substrate 10, described later, having a plurality of data lines 6a extending vertically and a plurality of scanning lines 3a extending horizontally in the pixel array region 10b, with the pixels 100a defined at positions corresponding to intersections thereof.

In the description below, the direction in which the data lines 6a extend is referred to as a first direction Y, whereas the direction in which the scanning lines 3a extend is referred to as a second direction X. In this embodiment, accordingly, the data line 6a correspond to a first signal line extending in the first direction Y, whereas the scanning line 3a correspond to a second signal line extending in the second direction X.

The pixel 100a includes a field-effect transistor 30 serving as a pixel-switching element and pixel electrode 9a, described later. The source of the field-effect transistor 30 is electrically connected to the data line 6a, whereas the gate of the field-effect transistor 30 is electrically connected to the scanning line 3a. The drain of the field-effect transistor 30 is electrically connected to the pixel electrode 9a.

The element substrate 10 has scanning-line drive circuits 104 and a data-line drive circuit 101 in a region outside the pixel array region 10b. The data-line drive circuit 101 is electrically connected to one end of each data line 6a to sequentially supply image signals supplied from an image-processing circuit to the data lines 6a. The scanning-line drive circuits 104 are electrically connected to the scanning lines 3a to sequentially supply scanning signals to the scanning lines 3a.

The pixel electrode 9a in the pixel 100a is disposed opposite a common electrode disposed on a counter substrate with a liquid crystal layer therebetween, as described later, thus constituting liquid crystal capacitor 50a. In addition, hold capacitor 60 is disposed in parallel with the liquid crystal capacitor 50a in the pixel 100a to prevent variations in image signals held by the liquid crystal capacitor 50a. In this embodiment, the hold capacitor 60 is formed by forming capacitor line 3b extending parallel to the scanning line 3a through the pixel 100a. The capacitor line 3b can each be provided for one pixel row parallel to the direction in which the scanning line 3a extends or can each be shared by two pixel rows adjacent to each other in the direction in which the data line 6a extend.

Structure of Liquid Crystal Panel and Element Substrate

Figure 2A:
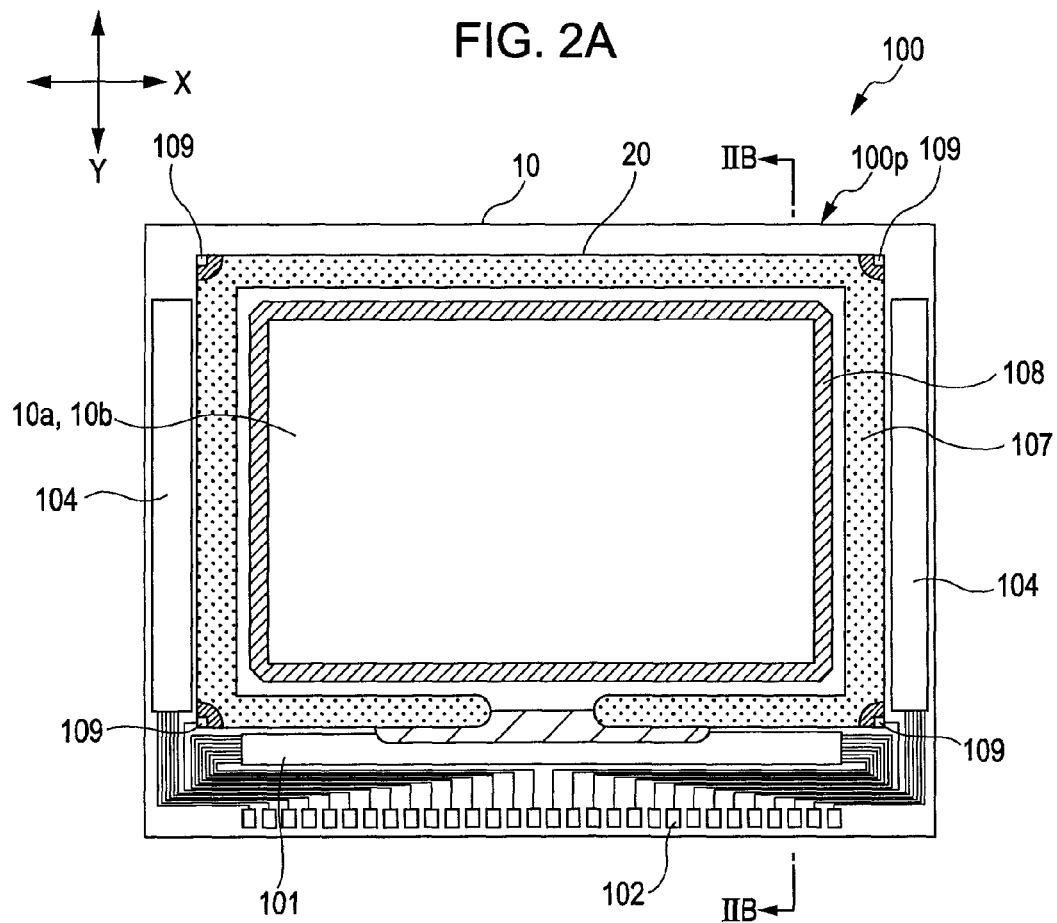
FIG. 2A is a plan view of a liquid crystal panel of the electro-optical device according to the embodiment of the invention and individual components thereof as viewed from a counter substrate side.
Figure 2B:
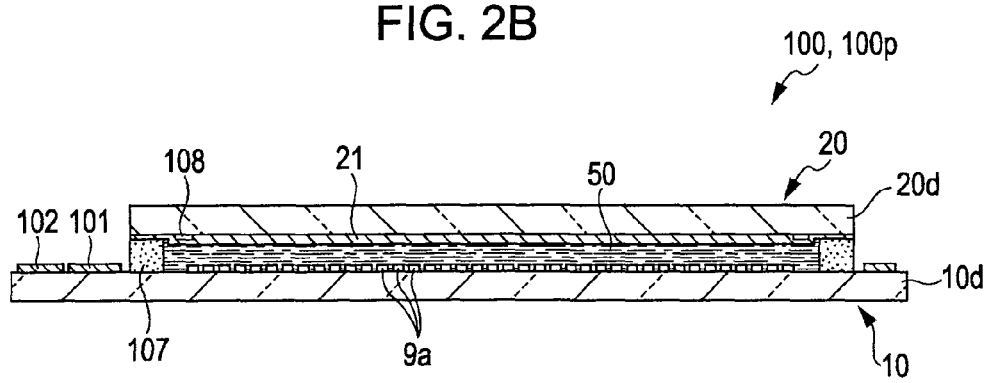
FIG. 2B is a sectional view of FIG. 2A taken along line IIB-IIB.

FIG. 2A is a plan view of a liquid crystal panel 100p of the electro-optical device 100 and individual components thereof as viewed from the counter substrate side, and FIG. 2B is a sectional view of FIG. 2A taken along line IIB-IIB. As shown in FIGS. 2A and 2B, the liquid crystal panel 100p of the electro-optical device 100 has the element substrate 10 bonded to a counter substrate 20 using a sealant 107 with a predetermined gap remaining therebetween. The sealant 107 is provided along the edges of the counter substrate 20. The sealant 107 is an adhesive formed of, for example, a photo-curable resin or a thermosetting resin and containing a gap-forming material, such as glass fiber or glass beads, for setting a predetermined distance between the two substrates 10 and 20. In this embodiment, the element substrate 10 includes a transparent substrate 10d as a support substrate, and the counter substrate 20 includes a similar transparent substrate 20d as a support substrate.

The data-line drive circuit 101 and a plurality of terminals 102 are disposed along one side of the element substrate 10 in a region outside the sealant 107, and the scanning-line drive circuits 104 are disposed along the two sides adjacent thereto. One or more top-to-bottom conductors 109 for providing electrical connection between the element substrate 10 and the counter substrate 20 are disposed at the corners of the counter substrate 20.

The pixel electrodes 9a are arranged in a matrix on the element substrate 10, as described later in detail. On the other hand, a frame 108 formed of a light-shielding material is disposed in a region inside the sealant 107 on the counter substrate 20 so that an image display region 10a is defined inside the frame 108. In addition, a common electrode 21 formed of an indium tin oxide (ITO) film is disposed on the counter substrate 20. A light-shielding film (not shown), called a black matrix or black stripes, may be disposed on the counter substrate 20 at the position corresponding to the region between the pixel electrodes 9a. In addition, dummy pixels may be provided in a region overlapping the frame 108 in the pixel array region 10b. In this case, the pixel array region 10b excluding the dummy pixels serves as the image display region 10a.

The electro-optical device 100 thus formed is configured either as a transmissive device or as a reflective device. To configure the electro-optical device 100 as a transmissive device, the pixel electrodes 9a are formed of transparent conductive films such as ITO films. To configure the electro-optical device 100 as a reflective device, the pixel electrodes 9a are formed of reflective conductive films. For a transmissive electro-optical device 100, light entering it through the element substrate 10 is modulated by a liquid crystal layer 50 for each pixel before exiting from the counter substrate 20, thus displaying an image. For a reflective electro-optical device 100, light entering it through the counter substrate 20 is reflected by the pixel electrodes 9a and is modulated by the liquid crystal layer 50 for each pixel before exiting from the counter substrate 20, thus displaying an image.

The electro-optical device 100 can be used as a color display for an electronic apparatus such as a mobile computer or a cellular phone. In this case, a color filter (not shown) and a protective film are disposed on the counter substrate 20. In addition, for example, a polarizing film, a retardation film, or a polarizing plate is disposed on the light-entering side of the counter substrate 20 in a predetermined orientation, depending on the type of liquid crystal layer 50 used, that is, the operational mode, such as a twisted nematic (TN) mode or a super-twisted nematic (STN) mode, or whether a normally white mode or a normally black mode is selected. In addition, the electro-optical device 100 can be used as an RGB light valve for a projection display (liquid crystal projector), described later. In this case, no color filter is provided because light components separated by dichroic mirrors for RGB color separation enter the respective RGB electro-optical devices 100 as projection light.

Structure of Pixels 100a

Figure 3:
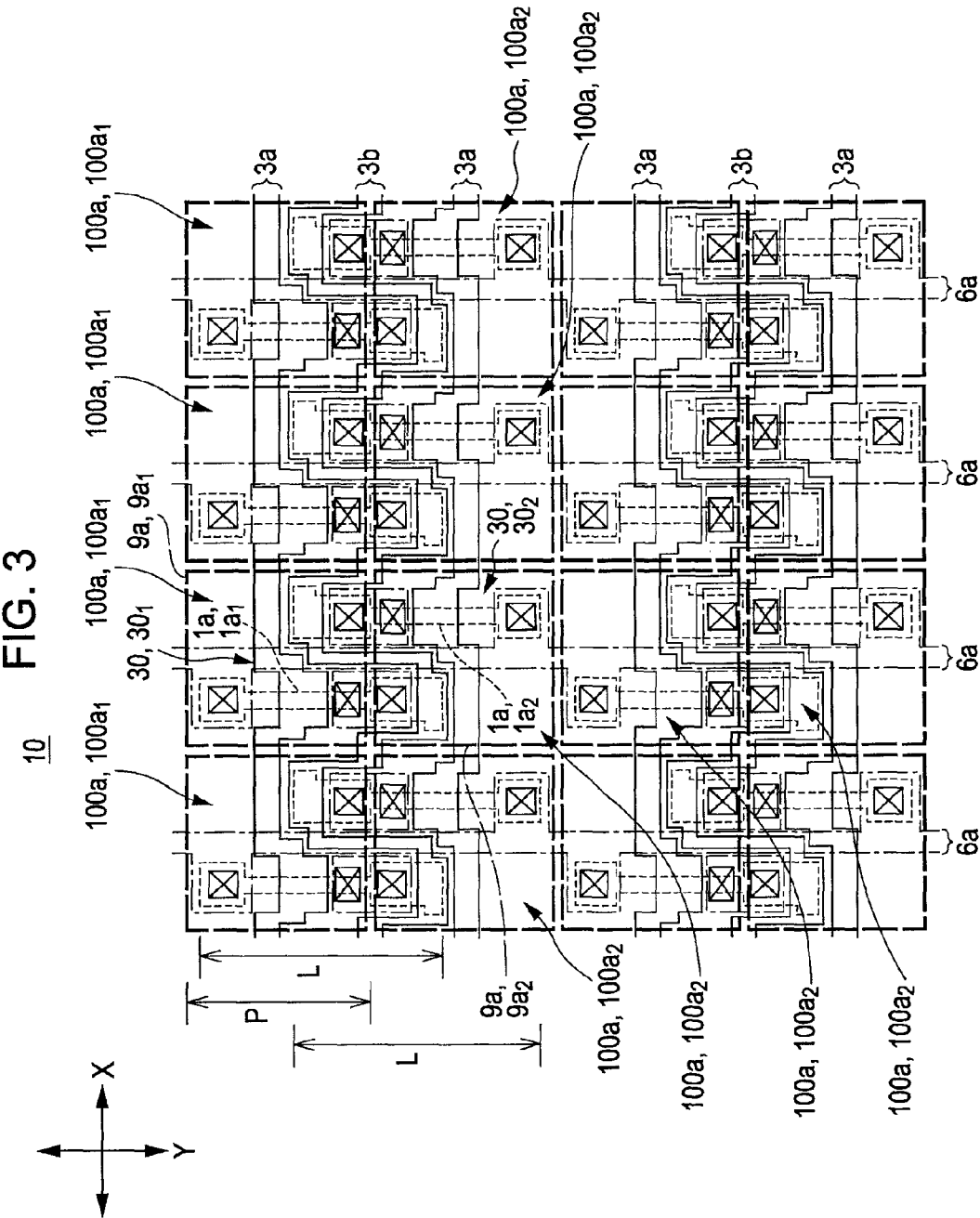
FIG. 3 is a plan view of pixels arranged in a matrix on an element substrate used in the electro-optical device according to the embodiment of the invention.
Figure 4A:
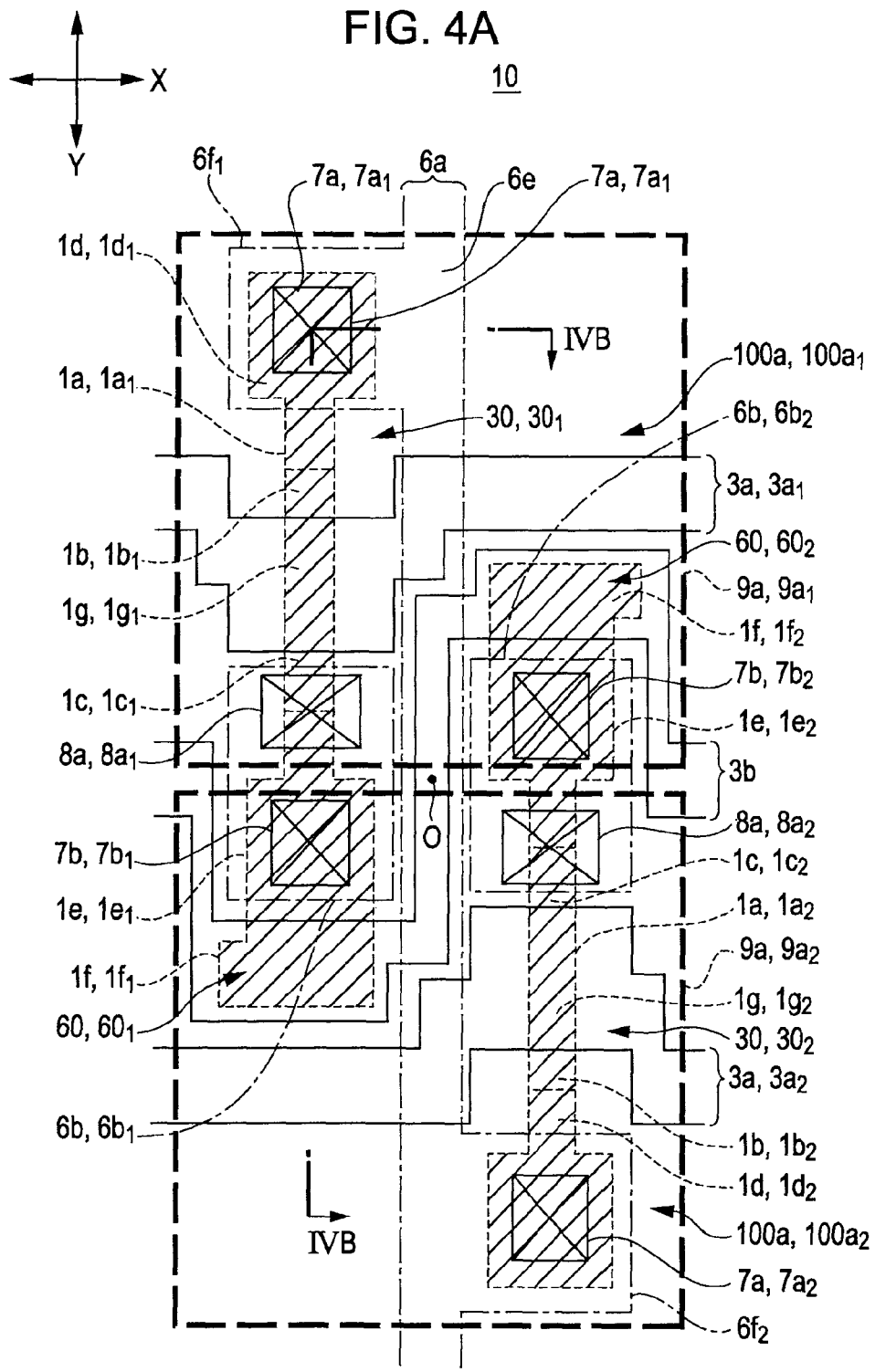
FIG. 4A is an enlarged plan view showing, of the pixels shown in FIG. 3, two pixels adjacent to each other in a first direction (in a direction in which data lines extend).
Figure 4B:
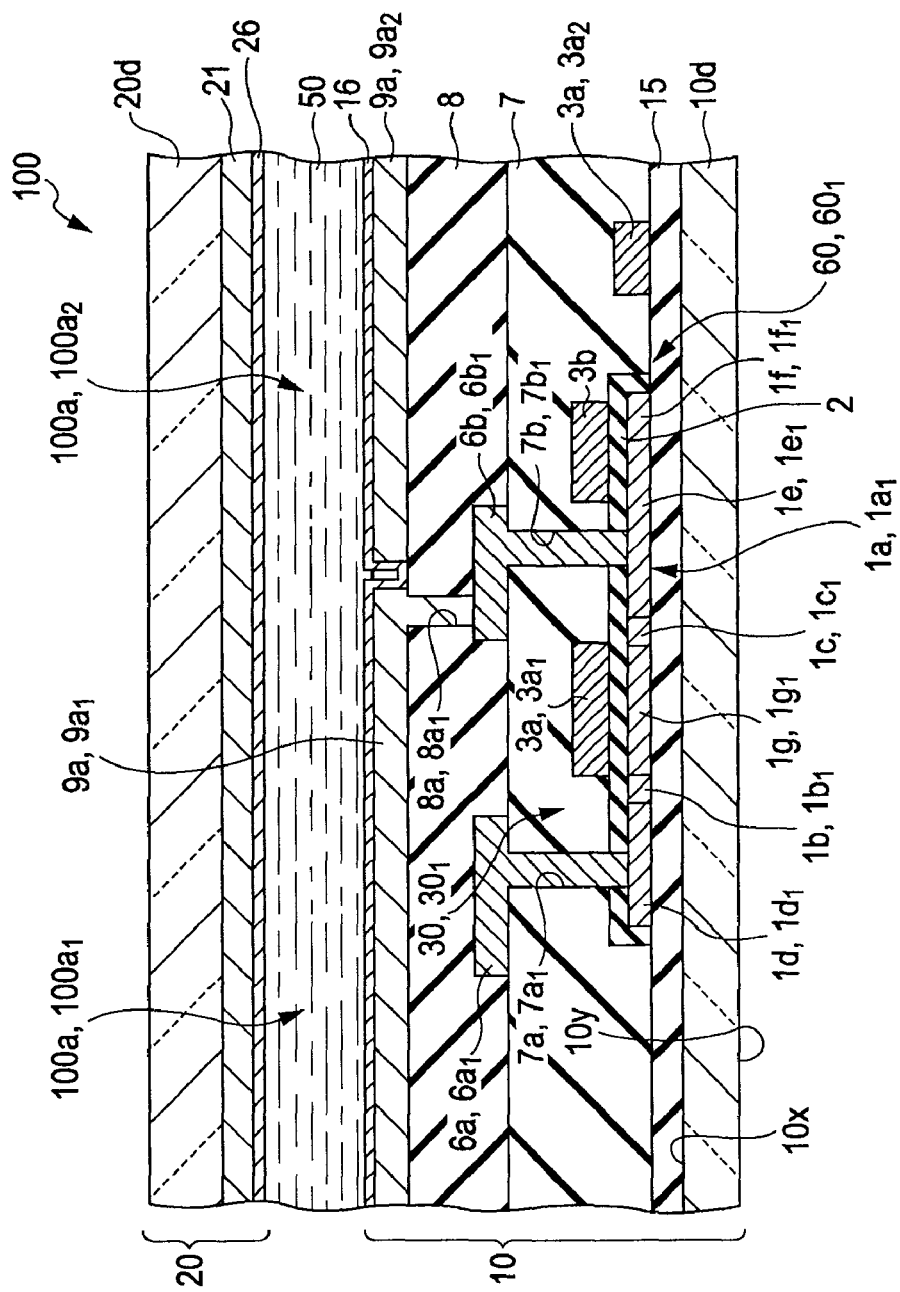
FIG. 4B is a sectional view of FIG. 4A taken along line IVB-IVB.

FIG. 3 is a plan view of the pixels 100a arranged in a matrix on the element substrate 10 used in the electro-optical device 100 according to this embodiment. FIG. 4A is an enlarged plan view showing, of the pixels 100a shown in FIG. 3, two pixels 100a (first and second pixels) adjacent to each other in the first direction Y (in the direction in which the data lines 6a extend), and FIG. 4B is a sectional view of FIG. 4A taken along line IVB-IVB. In FIGS. 3 and 4A, the pixel electrodes 9a are indicated by the long-dashed lines, the data lines 6a are indicated by the one-dot chain lines, the scanning lines 3a and the capacitor lines 3b are indicated by the solid lines, and semiconductor layers 1a are indicated by the short-dashed lines.

As shown in FIGS. 3, 4A, and 4B, the transparent substrate 10d (support substrate), such as a quartz substrate or a glass substrate, has a first surface 10x opposite the counter substrate 20 and a second surface 10y. A transparent base insulating layer 15, such as a silicon oxide film, is disposed on the first surface 10x of the transparent substrate 10d. The n-channel field-effect transistors 30 are disposed on the base insulating layer 15 at positions where they overlap the pixel electrodes 9a. The field-effect transistors 30 include semiconductor layers 1a, such as island-shaped polysilicon films or island-shaped single-crystal semiconductor layers, each having a lightly doped drain (LDD) structure including a channel region 1g, a lightly doped source region 1b, a heavily doped source region 1d, a lightly doped drain region 1c, and a heavily doped drain region 1e. Transparent gate insulating layers 2, such as silicon oxide films, are disposed on the surfaces of the semiconductor layers 1a. Gate electrodes (scanning lines 3a), such as metal films or doped silicon films, are disposed on the surfaces of the gate insulating layers 2. The semiconductor layers 1a include extending portions 1f extending from the heavily doped drain regions 1e, and the capacitor lines 3b are disposed opposite the extending portions 1f with the gate insulating layers 2 therebetween, thus constituting the hold capacitors 60. Although the field-effect transistors 30 have an LDD structure in this embodiment, they may instead have a structure in which heavily doped source regions and heavily doped drain regions are formed so as to be self-aligned to the scanning lines 3a. In addition, although the gate insulating layers 2 are silicon oxide films formed by thermal oxidation in this embodiment, they may instead be silicon oxide films or silicon nitride films formed by, for example, CVD.

Transparent interlayer insulating films 7 and 8, such as silicon oxide films, are disposed over the field-effect transistors 30. The data lines 6a and drain electrodes 6b, such as metal films or doped silicon films, are disposed on the surface of the interlayer insulating film 7. The data lines 6a are electrically connected to the heavily doped source regions 1d via contact holes 7a in the interlayer insulating film 7. The drain electrodes 6b are electrically connected to the heavily doped drain regions 1e via contact holes 7b in the interlayer insulating film 7.

The pixel electrodes 9a are disposed on the surface of the interlayer insulating film 8, and an alignment film 16 is disposed over the pixel electrodes 9a. The pixel electrode 9a is electrically connected to the drain electrode 6b via contact hole 8a in the interlayer insulating film 8 so that The pixel electrode 9a is electrically connected to the heavily doped drain region 1e via the drain electrode 6b.

In this embodiment, the electro-optical device 100 is configured as a reflective liquid crystal device. Accordingly, the pixel electrodes 9a are formed of, for example, aluminum films, aluminum alloy films, silver films, silver alloy films, or multilayer films thereof. Alternatively, the pixel electrodes 9a may be formed of transparent thin films, such as ITO films, with reflective layers, such as aluminum films, aluminum alloy films, silver films, silver alloy films, or multilayer films thereof, disposed under the pixel electrodes 9a. In addition, the pixel electrodes 9a may be electrically connected to the drain electrodes 6b via plug electrodes, such as molybdenum or tungsten electrodes, embedded in the contact holes 8a. Because the base member of the element substrate 10 of the reflective electro-optical device 100 does not need to be transparent, a single-crystal silicon substrate may be used as the base member of the element substrate 10 instead of the transparent substrate 10d.

The element substrate 10 thus configured is disposed opposite the counter substrate 20 such that the pixel electrodes 9a face the common electrode 21. The liquid crystal layer 50, serving as an electro-optical material, is sealed in the space surrounded by the sealant 107 between the two substrates 10 and 20. With no electric field applied from the pixel electrodes 9a, the liquid crystal layer 50 is aligned in a predetermined orientation by the alignment film 16 on the element substrate 10 and an alignment film 26 on the counter substrate 20. The liquid crystal layer 50 is formed of, for example, a single type of nematic liquid crystal or a mixture of several types of nematic liquid crystals.

Detailed Structure of Pixels 100a

In this embodiment, to reduce the pitch of the pixels 100a in the first direction Y (in the direction in which the data lines 6a extend), the semiconductor layer 1a, field-effect transistor 30, and pixel electrode 9a of each two pixels 100a adjacent to each other in the first direction Y are laid out so as to have the following relationships. In the description below, of each two pixels 100a adjacent to each other in the first direction Y, one pixel 100a is referred to as a first pixel $100a_1$, whereas the other pixel 100a is referred to as a second pixel $100a_2$. The main components belonging to the first pixel $100a_1$ are referred to as "first", with the subscript "$_1$" added to the ends of the reference numerals thereof, whereas the main components belonging to the second pixel $100a_2$ are referred to as "second", with the subscript "$_2$" added to the ends of the reference numerals thereof. Hence, the semiconductor layer 1a, the field-effect transistor 30, and the pixel electrode 9a belonging to the first pixel $100a_1$ are referred to as the first semiconductor layer $1a_1$, the first field-effect transistor $30_1$, and the first pixel electrode $9a_1$, respectively. Similarly, the semiconductor layer 1a, the field-effect transistor 30, and the pixel electrode 9a belonging to the second pixel $100a_2$ are referred to as the second semiconductor layer $1a_2$, the second field-effect transistor $30_2$, and the second pixel electrode $9a_2$, respectively. As for the other components, the subscript "$_1$" is added to the ends of the reference numerals of the components belonging to the first pixel $100a_1$, whereas the subscript "$_2$" is added to the ends of the reference numerals of the components belonging to the second pixel $100a_2$.

As shown in FIGS. 4A and 4B, in the first pixel $100a_1$, the first semiconductor layer $1a_1$ (hatched region in FIG. 4A) constituting the first field-effect transistor $30_1$ is disposed on one side of the data line 6a in the second direction X, and extends along the data line 6a in the first direction Y so as to cross the scanning line $3a_1$. In the region where the first semiconductor layer $1a_1$ is provided, the contact hole $7a_1$, via which the data line 6a is electrically connected to the heavily doped source region $1d_1$ of the first semiconductor layer $1a_1$, and the contact hole $7b_1$, via which the drain electrode $6b_1$ is electrically connected to the heavily doped drain region $1e_1$ of the first semiconductor layer $1a_1$, are provided at positions symmetrical with respect to the scanning line $3a_1$ (gate electrode) in the first direction Y. The data line 6a includes a main portion 6e extending linearly in the first direction Y and a protruding portion $6f_1$ protruding from the main portion 6e to the position where the contact hole $7a_1$ is provided toward one side in the second direction X. The drain electrode $6b_1$ extends from the position where the contact hole $7b_1$ is provided to the vicinity of the scanning line $3a_1$. The contact hole $8a_1$ via which the first pixel electrode $9a_1$ is electrically connected to the drain electrode $6b_1$ is provided in the vicinity of the scanning line $3a_1$. The first semiconductor layer $1a_1$ includes the extending portion $1f_1$ extending from the heavily doped drain region $1e_1$ in the direction away from the scanning line $3a_1$.

In the second pixel $100a_2$, on the other hand, the second semiconductor layer $1a_2$ (hatched region in FIG. 4A) constituting the second field-effect transistor $30_2$ is disposed on the other side of the data line 6a in the second direction X, and extends along the data line 6a in the first direction Y so as to cross the scanning line $3a_2$. In the region where the second semiconductor layer $1a_2$ is provided, the contact hole $7a_2$, via which the data line 6a is electrically connected to the heavily doped source region $1d_2$ of the second semiconductor layer $1a_2$, and the contact hole $7b_2$, via which the drain electrode $6b_2$ is electrically connected to the heavily doped drain region $1e_2$ of the second semiconductor layer $1a_2$, are provided at positions symmetrical with respect to the scanning line $3a_2$ (gate electrode) in the first direction Y.

The second semiconductor layer $1a_2$ and the drain electrode $6b_2$ are disposed on the opposite side of the data line 6a against the first semiconductor layer $1a_1$ and the drain electrode $6b_1$. Hence, the data line 6a includes a protruding portion $6f_2$ protruding from the main portion 6e to the position where the contact hole $7a_2$ is provided toward the other side of the data line 6a in the second direction X.

The drain electrode $6b_2$ extends from the position where the contact hole $7b_2$ is provided to the vicinity of the scanning line $3a_2$. The contact hole $8a_2$ via which the second pixel electrode $9a_2$ is electrically connected to the drain electrode $6b_2$ is provided in the vicinity of the scanning line $3a_2$. The second semiconductor layer $1a_2$ includes the extending portion $1f_2$ extending from the heavily doped drain region $1e_2$ in the direction away from the scanning line $3a_2$.

The components such as the semiconductor layer 1a, the field-effect transistor 30, and the pixel electrode 9a in the first pixel $100a_1$ have the same sizes as those in the second pixel $100a_2$. In addition, the components such as the semiconductor layer 1a, the field-effect transistor 30, and the pixel electrode 9a in the first pixel $100a_1$ are symmetrical with those in the second pixel $100a_2$ about a central position O between the first pixel $100a_1$ and the second pixel $100a_2$. Accordingly, the first semiconductor layer $1a_1$ and the second semiconductor layer $1a_2$ are displaced from each other in the second direction X and are disposed on both sides of the data line 6a.

In this embodiment, the first pixel electrode $9a_1$ and the second pixel electrode $9a_2$ have a rectangular shape with four sides extending in the first direction Y or the second direction X. The scanning line $3a_1$ extends so as to overlap a substantially central position of the first pixel electrode $9a_1$ in the first direction Y, whereas the scanning line $3a_2$ extends so as to overlap a substantially central position of the second pixel electrode $9a_2$ in the first direction Y. The data line 6a extends so as to overlap substantially the central position of the first and the second pixel electrode $9a_1$ and $9a_2$ in the second direction X.

Thus, the first pixel electrode $9a_1$ overlaps the lightly doped drain region $1c_1$, channel region $1g_1$, lightly doped source region $1b_1$, and heavily doped source region $1d_1$ of the first field-effect transistor $30_1$ in plan view and also overlaps the heavily doped drain region $1e_2$ and extending portion $1f_2$ of the second field-effect transistor $30_2$ in plan view. Similarly, the second pixel electrode $9a_2$ overlaps the lightly doped drain region $1c_2$, channel region $1g_2$, lightly doped source region $1b_2$, and heavily doped source region $1d_2$ of the second field-effect transistor $30_2$ in plan view and also overlaps the heavily doped drain region $1e_1$ and extending portion $1f_1$ of the first field-effect transistor $30_1$ in plan view.

In this embodiment, the first semiconductor layer $1a_1$ extends from a position where it overlaps the first pixel electrode $9a_1$ in plan view to a position where it overlaps the second pixel electrode $9a_2$ in plan view, whereas the second semiconductor layer $1a_2$ extends from a position where it overlaps the second pixel electrode $9a_2$ in plan view to a position where it overlaps the first pixel electrode $9a_1$ in plan view. In this embodiment, additionally, an end of the first semiconductor layer $1a_1$ facing toward the second pixel electrode $9a_2$ is closer to the second pixel electrode $9a_2$ than an end of the second semiconductor layer $1a_2$ facing toward the first pixel electrode $9a_1$. Accordingly, the end of the second semiconductor layer $1a_2$ facing toward the first pixel electrode $9a_1$ is closer to the first pixel electrode $9a_1$ than the end of the first semiconductor layer $1a_1$ facing toward the second pixel electrode $9a_2$.

Because the components in the first and the second pixels $100a_1$ and $100a_2$ are disposed in a staggered pattern in this embodiment, the scanning lines $3a_1$ and $3a_2$ extend in the second direction X while being bent in the first direction Y so that the channel regions $1g_1$ and $1g_2$ are located at predetermined positions in the first and the second semiconductor layers $1a_1$ and $1a_2$, respectively. In addition, the extending portion $1f_1$ of the first semiconductor layer $1a_1$ and the extending portion $1f_2$ of the second semiconductor layer $1a_2$ are disposed between the scanning lines $3a_1$ and $3a_2$. Accordingly, the capacitor line $3b$, functioning as a common upper electrode in the first and the second pixels $100a_1$ and $100a_2$, extends in the second direction X while being bent in the first direction Y so as to overlap the extending portion $1f_1$ of the first semiconductor layer $1a_1$ and the extending portion $1f_2$ of the second semiconductor layer $1a_2$, thus constituting the hold capacitors $60_1$ and $60_2$. Alternatively, the capacitor line $3b$ may be divided into a capacitor line $3b$ overlapping the extending portion $1f_1$ of the first semiconductor layer $1a_1$ and a capacitor line $3b$ overlapping the extending portion $1f_2$ of the second semiconductor layer $1a_2$.

In addition, with the layout described in this embodiment, as shown in FIG. 3, the length L of the first and the second semiconductor layers $1a_1$ and $1a_2$ in the first direction Y can be made larger than the pitch of the first and the second pixels $100a_1$ and $100a_2$ (pixel pitch P). In other words, the length L of the first and the second semiconductor layers $1a_1$ and $1a_2$ in the first direction Y can be made larger than the pitch of the first and the second pixel electrodes $9a_1$ and $9a_2$ (pixel electrode pitch=pixel pitch P). The first pixel $100a_1$ and the second pixel $100a_2$ constitute a pixel pair. A plurality of the pixel pairs is arranged on the element substrate 10 both in the first direction Y and in the second direction X. In other words, the pixel electrode pairs of the first and the second pixel electrode $9a_1$ and $9a_2$ are arranged both in the first direction Y and in the second direction X. Thus, the length L of all semiconductor layers $1a$ on the element substrate 10 in the first direction Y is larger than the pixel pitch P.

Main Advantages of Embodiment

In the electro-optical device 100 according to this embodiment, as described above, the first semiconductor layer $1a_1$ constituting the first field-effect transistor $30_1$ is disposed in the first pixel $100a_1$, and the second semiconductor layer $1a_2$ constituting the second field-effect transistor $30_2$ is disposed in the second pixel $100a_2$ which is adjacent to the first pixel $100a_1$ in the first direction Y. The first semiconductor layer $1a_1$ and the second semiconductor layer $1a_2$ are displaced from each other in the second direction X. This allows the first semiconductor layer $1a_1$ to be extended from the first pixel $100a_1$ to the region where the second pixel $100a_2$ is provided and the second semiconductor layer $1a_2$ to be extended from the second pixel $100a_2$ to the region where the first pixel $100a_1$ is provided. That is, even if the pitch of the first and the second pixels $100a_1$ and $100a_2$ (pixel pitch P) is reduced, the length L of the first and the second semiconductor layers $1a_1$ and $1a_2$ in the first direction Y can be made larger than the pixel pitch. Accordingly, even if the pixel pitch P is reduced, problems such as a decrease in the source-drain breakdown voltage of the field-effect transistors 30 do not occur. The pixel pitch P can therefore be reduced without degrading the characteristics of the field-effect transistors 30 to, for example, increase image resolution.

In addition, the first semiconductor layer $1a_1$ extends from a position where it overlaps the first pixel electrode $9a_1$ in plan view to a position where it overlaps the second pixel electrode $9a_2$ in plan view, whereas the second semiconductor layer $1a_2$ extends from a position where it overlaps the second pixel electrode $9a_2$ in plan view to a position where it overlaps the first pixel electrode $9a_1$ in plan view. This allows the first and the second semiconductor layers $1a_1$ and $1a_2$ to be extended to the maximum extent possible. Accordingly, even if the pixel pitch P is reduced, problems such as a decrease in the source-drain breakdown voltage of the field-effect transistors 30 do not occur.

In addition, the components provided in the first pixel $100a_1$ are symmetrical with those provided in the second pixel $100a_2$ about the central position O between the first and the second pixels $100a_1$ and $100a_2$ in their entirety. For example, the first semiconductor layer $1a_1$ is symmetrical with the second semiconductor layer $1a_2$ about the central position O between the first and the second pixels $100a_1$ and $100a_2$, and the first pixel electrode $9a_1$ is symmetrical with the second pixel electrode $9a_2$ about the central position O between the first and the second pixels $100a_1$ and $100a_2$. This allows easy pixel design and effective utilization of arrangement spaces in the first and the second pixels $100a_1$ and $100a_2$ to the maximum extent possible. In addition, because the plurality of the pixel pairs is arranged both in the first direction Y and in the second direction X, they can be easily designed so that the pixel pitch P is reduced over the entire pixel array region 10b.

In addition, because the electro-optical device 100 according to this embodiment is a reflective device (reflective liquid crystal device), the pixel aperture rate (the proportion of the area where display light can be emitted in the pixels) is not decreased even if the field-effect transistor 30 is disposed in the region where the field-effect transistor 30 overlaps the pixel electrode $9a$. This allows the field-effect transistor 30 to be made longer in the pixel $100a$.

Other Embodiments

In the above embodiment, the first and the second semiconductor layers $1a_1$ and $1a_2$ extend parallel to the data line $6a$. Alternatively, the first and the second semiconductor layers $1a_1$ and $1a_2$ may extend in a direction inclined with respect to the first direction Y (the direction in which the data line $6a$ extends).

In the above embodiment, the end of the first semiconductor layer $1a_1$ facing toward the second pixel electrode $9a_2$ is closer to the second pixel electrode $9a_2$ than the end of the second semiconductor layer $1a_2$ facing toward the first pixel electrode $9a_1$, and the end of the second semiconductor layer $1a_2$ facing toward the first pixel electrode $9a_1$ is closer to the first pixel electrode $9a_1$ than the end of the first semiconductor layer $1a_1$ facing toward the second pixel electrode $9a_2$. Alternatively, the end of the first semiconductor layer $1a_1$ facing toward the second pixel electrode $9a_2$ and the end of the second semiconductor layer $1a_2$ facing toward the first pixel electrode $9a_1$ may be adjacent to each other in the second direction X.

In the above embodiment, the pixel pitch (pixel electrode pitch) is reduced to a length smaller than the length of the semiconductor layer $1a$ of the field-effect transistor 30 in the first direction Y. Alternatively, the pixel pitch may be reduced to a length equal to or slightly larger than the length of the semiconductor layer $1a$ of the field-effect transistor 30 in the first direction Y.

In the above embodiment, the pixel electrode $9a$ is electrically connected to the heavily doped drain region $1e$ via the drain electrode $6b$. Alternatively, the pixel electrode $9a$ may be directly connected to the heavily doped drain region $1e$. In this case, the pixel electrode $9a$ may have a partially protruding planar shape.

In the above embodiment, the pixel electrode $9a$ and the heavily doped drain region $1e$ are electrically connected together near the boundary between the first and the second pixels $100a_1$ and $100a_2$. Alternatively, the data line $6a$ and the heavily doped source region $1d$ may be electrically connected together near the boundary between the first and the second pixels $100a_1$ and $100a_2$.

In the above embodiment, the direction in which the data line $6a$ extend is referred to as the first direction Y, the direction in which the scanning line $3a$ extend is referred to as the second direction X, and the pixel pitch is reduced in the first direction Y (in the direction in which the data line $6a$ extend). Alternatively, the direction in which the scanning line $3a$ extend may be referred to as the first direction, the direction in which the data line $6a$ extend may be referred to as the second direction, and the pixel pitch may be reduced in the first direction (in the direction in which the scanning line $3a$ extend). In this case, the scanning line $3a$ correspond to first signal line, whereas the data line $6a$ correspond to second signal line.

Although the semiconductor layer $1a$ is formed of polysilicon or single-crystal silicon in the above embodiment, the semiconductor layer $1a$ may instead be formed of amorphous silicon.

Although the invention is applied to a reflective liquid crystal device in the above embodiment, it may instead be applied to a transmissive liquid crystal device.

Although the invention is applied to a liquid crystal device as an electro-optical device in the above embodiment, it may instead be applied to another electro-optical device such as an organic electroluminescent device. For example, in an organic electroluminescent device described below with reference to FIG. 5, field-effect transistors are similarly disposed in a plurality of pixels arranged in a matrix.

Figure 5:
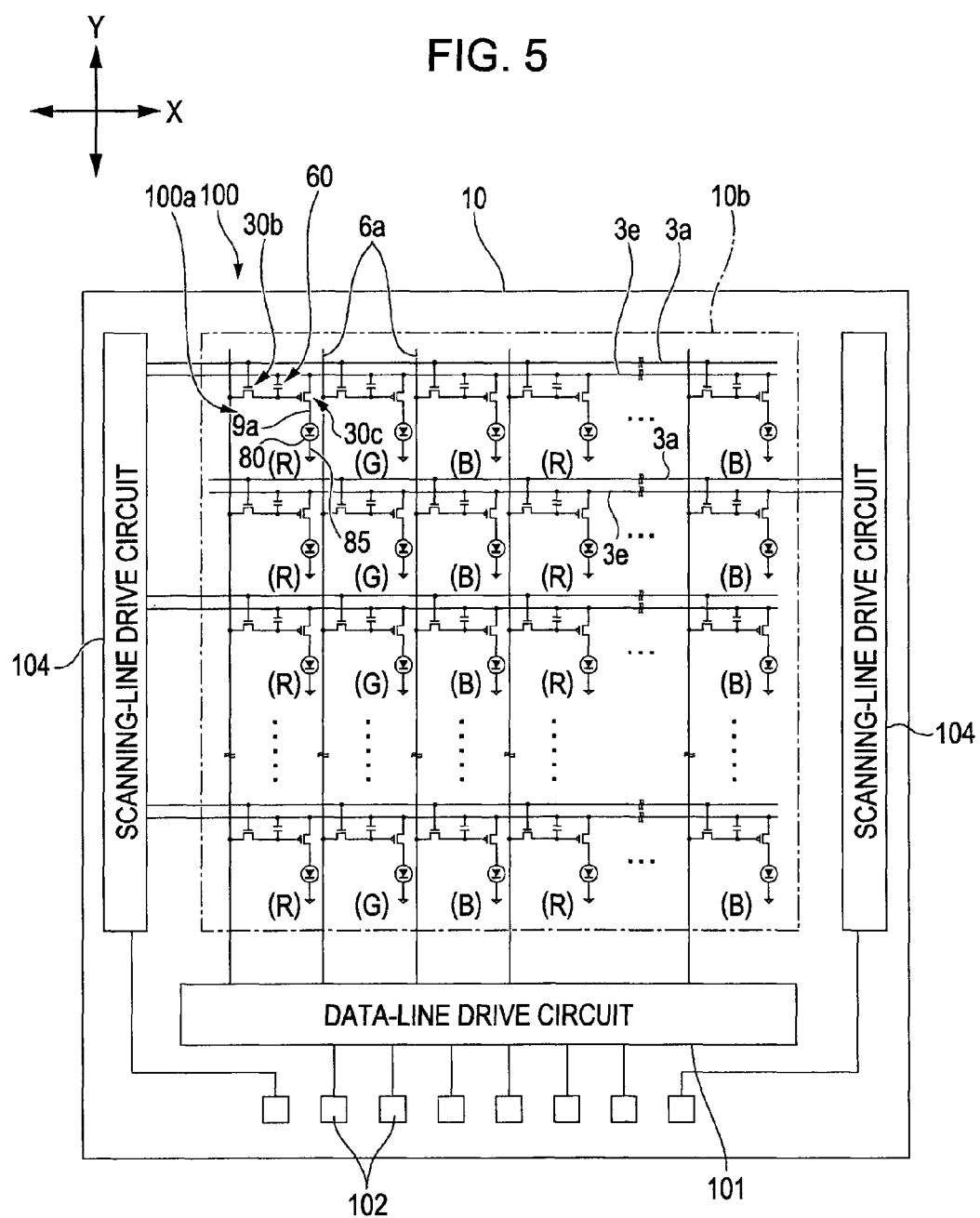
FIG. 5 is a block diagram showing the electrical configuration of an organic electroluminescent device serving as an electro-optical device according to an embodiment of the invention.

FIG. 5 is a block diagram showing the electrical configuration of an organic electroluminescent device serving as an electro-optical device according to an embodiment of the invention. In FIG. 5, the components corresponding to those in FIGS. 1 to 4 are indicated by the same reference numerals where possible to clarify the correspondence between the structure described with reference to FIGS. 1 to 4 and the structure to be described with reference to FIG. 5.

An electro-optical device 100 shown in FIG. 5 is an organic electroluminescent device, including an element substrate 10 having a plurality of scanning lines $3a$, a plurality of data lines $6a$ extending in such a direction as to cross the scanning lines $3a$, and a plurality of power lines $3e$ extending parallel to the scanning lines $3a$. A plurality of pixels $100a$ is arranged in a matrix in a pixel array region $10b$ of the element substrate 10. A data-line drive circuit 101 and scanning-line drive circuits 104 are disposed in a region outside the pixel array region $10b$. The data lines $6a$ are connected to the data-line drive circuit 101, whereas the scanning lines $3a$ are connected to the scanning-line drive circuits 104. The pixel $100a$ includes switching field-effect transistor $30b$ whose gate electrode is supplied with scanning signal via the scanning line $3a$, hold capacitor 60 that hold pixel signals supplied from the data line $6a$ via the switching field-effect transistor $30b$, and drive field-effect transistor $30c$ whose gate electrode is supplied with the pixel signals held by the hold capacitor 60. The pixel $100a$ also includes pixel electrode $9a$ (anode layer) into which a drive current flows from the power line $3e$ when electrically connected to the power line $3e$ via the field-effect transistor $30c$ and an organic functional layer constituting organic electroluminescent element 80 between the pixel electrode $9a$ and a cathode layer 85.

In the above structure, if the scanning line $3a$ is driven to switch on the switching field-effect transistor $30b$, the potential of the data line $6a$ at that time is held by the hold capacitor 60. The charge held by the hold capacitor 60 determines the on/off state of the drive field-effect transistor $30c$. A current flows from the power line $3e$ into the pixel electrode $9a$ via the channel of the drive field-effect transistor $30c$. The current then flows through the organic functional layer into the cathode layer 85. As a result, the organic electroluminescent element 80 emits light on the basis of the current flowing therethrough. The light exits from the side opposite the element substrate 10 side. Although the power lines $3e$ are parallel to the scanning lines $3a$ in the structure shown in FIG. 5, the power lines $3e$ may instead be parallel to the data lines $6a$. In addition, although the power lines $3e$ are used to constitute the hold capacitors 60 in the structure shown in FIG. 5, capacitor lines may be provided in addition to the power lines $3e$ and be used to constitute the hold capacitors 60.

In the above electro-optical device 100, if the staggered pattern described in the first embodiment is applied to either or both of the switching field-effect transistor $30b$ and the drive field-effect transistor $30c$ in the pixel pair which contains the two pixels $100a$ (first and second pixels) adjacent to each other in the first direction (in the direction in which the data lines $6a$ extend), the semiconductor layers of the pixel pair can be extended to positions where an end of the semiconductor layer of the first pixel is adjacent to an end of the semiconductor layer of the second pixel. In addition, if the staggered pattern described in the first embodiment is applied to either or both of the switching field-effect transistor $30b$ and the drive field-effect transistor $30c$ in the pixel pair which contains the two pixels $100a$ (first and second pixels) adjacent to each other in the direction in which the scanning lines $3a$ extend, the semiconductor layers of the pixel pair can be extended to positions where an end of the semiconductor layer of the first pixel is adjacent to an end of the semiconductor layer of the second pixel. Accordingly, even if the pixel pitch is reduced, problems such as a decrease in the source-drain breakdown voltage of the field-effect transistors $30b$ and $30c$ do not occur.

When the invention is applied to an organic electroluminescent device, it is desirable to apply the invention to a top-emission organic electroluminescent device in which light emitted from the organic electroluminescent elements 80 exits from the side opposite the field-effect transistor 30b and 30c side. Such a top-emission organic electroluminescent device has the advantage that the pixel aperture rate (the proportion of the area where display light can be emitted in the pixels) is not decreased even if the field-effect transistors 30b and 30c are disposed in regions where they overlap the pixel electrodes 9a.

Application to Electronic Apparatuses

Figure 6A:
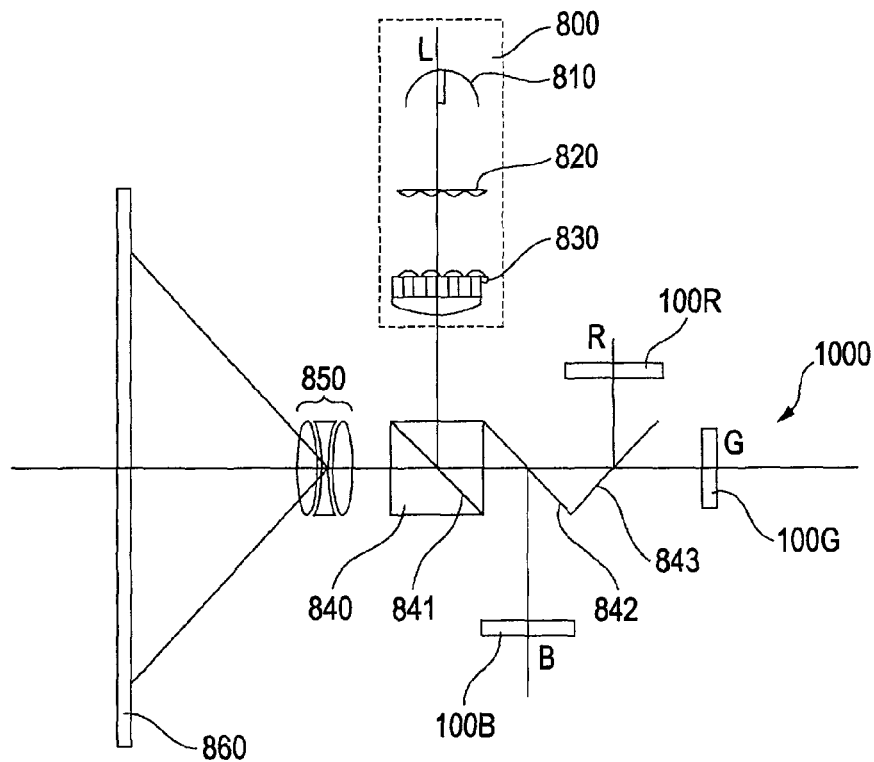
FIG. 6A is a diagram of an electronic apparatus including reflective electro-optical devices according to an embodiment of the invention.

Of the electro-optical devices 100 shown in FIGS. 1 and 5, the liquid crystal device shown in FIG. 1 can be applied to a projection display (liquid crystal projector, electronic apparatus) shown in FIG. 6A. In addition, the liquid crystal device shown in FIG. 1 and the organic electroluminescent device shown in FIG. 5 can be applied to portable electronic apparatuses shown in FIGS. 6B and 6C.

A projection display 1000 shown in FIG. 6A includes a polarizing illumination unit 800 including a light source 810, an integrator lens 820, and a polarization conversion element 830 arranged along a system optical axis L and a polarizing beam splitter 840 that reflects an s-polarized light beam emitted from the polarizing illumination unit 800 on an s-polarized-light-beam reflecting surface 841. The projection display 1000 also includes a dichroic mirror 842 that separates a blue light (B) component from the light reflected by the s-polarized-light-beam reflecting surface 841 of the polarizing beam splitter 840 and a dichroic mirror 843 that reflects and separates a red light (R) component from the light from which the blue light (B) component has been separated. The projection display 1000 also includes three reflective electro-optical devices 100 (reflective electro-optical devices 100R, 100G, and 100B) on which the respective light components are incident. In the projection display 1000, the light components modulated by the three reflective electro-optical devices 100R, 100G, and 100B are combined together by the dichroic mirrors 842 and 843 and the polarizing beam splitter 840, and the combined light is projected onto a screen 860 through a magnifying projection optical system 850.

Figure 6B:
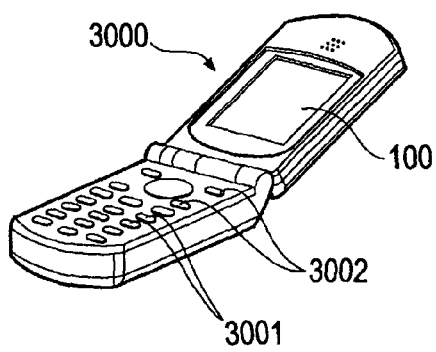
FIG. 6B is a diagram of an electronic apparatus including a reflective electro-optical device according to an embodiment of the invention.
Figure 6C:
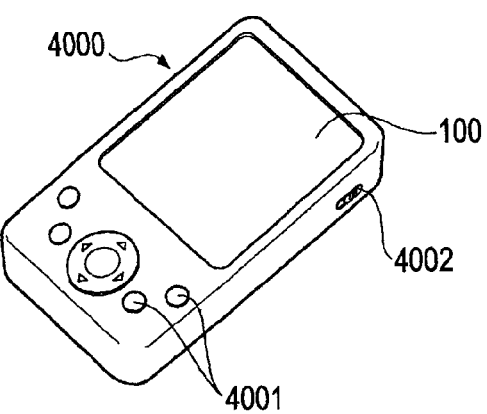
FIG. 6C is a diagram of an electronic apparatus including a reflective electro-optical device according to an embodiment of the invention.

A cellular phone 3000 shown in FIG. 6B includes a plurality of operating buttons 3001, scroll buttons 3002, and a reflective electro-optical device 100 serving as a display unit. A screen displayed on the reflective electro-optical device 100 is scrolled by operating the scroll buttons 3002. A portable information terminal (personal digital assistant (PDA)) shown in FIG. 6C includes a plurality of operating buttons 4001, a power switch 4002, and a reflective electro-optical device 100 serving as a display unit. Various information such as an address book and a schedule book is displayed on the reflective electro-optical device 100 by operating the operating buttons 4001.

In addition, a color reflective electro-optical device 100 can be provided by forming a color filter on, for example, the counter substrate 20. In addition, a reflective electro-optical device 100 including a color filter can be used to constitute a single-panel projection display.

What is claimed is:

1. An electro-optical device comprising an element substrate having:
    a first signal line extending in a first direction;
    a second signal line extending in a second direction crossing the first direction;
    a first pixel electrode electrically connected to the first signal line;
    a second pixel electrode electrically connected to the first signal line and adjacent to the first pixel electrode;
    a first field-effect transistor electrically connecting the first pixel electrode to the first signal line; and a second field-effect transistor electrically connecting the second pixel electrode to the first signal line; wherein the first field-effect transistor includes a first semiconductor layer extending in a direction crossing the second direction,
    wherein the second field-effect transistor includes a second semiconductor layer extending in the direction crossing the second direction,
    wherein the first semiconductor layer and the second semiconductor layer are displaced from each other in the second direction, and
    wherein an end of the first semiconductor layer facing toward the second pixel electrode is adjacent to an end of the second semiconductor layer facing toward the first pixel electrode or is closer to the second pixel electrode than the end of the second semiconductor layer facing toward the first pixel electrode.

2. The electro-optical device according to claim 1, wherein a length of the first semiconductor layer in the first direction and a length of the second semiconductor layer in the first direction are larger than a pitch between the first pixel electrode and the second pixel electrode.

3. The electro-optical device according to claim 1, wherein the first semiconductor layer extends from a position where the first semiconductor layer overlaps the first pixel electrode in plan view to a position where the first semiconductor layer overlaps the second pixel electrode in plan view; and
    the second semiconductor layer extends from a position where the second semiconductor layer overlaps the second pixel electrode in plan view to a position where the second semiconductor layer overlaps the first pixel electrode in plan view.

4. The electro-optical device according to claim 1, wherein the first semiconductor layer is symmetrical with the second semiconductor layer about a position between the first pixel electrode and the second pixel electrode; and
    the first pixel electrode is symmetrical with the second pixel electrode about a position between the first pixel electrode and the second pixel electrode.

5. The electro-optical device according to claim 1, wherein a plurality of pixel electrode pairs, each of the pixel electrode pairs including the first pixel electrode and the second pixel electrode is arranged both in the first direction and in the second direction.

6. The electro-optical device according to claim 1, further comprising:
    a counter substrate disposed opposite the element substrate; and
    a liquid crystal layer held between the element substrate and the counter substrate.

7. The electro-optical device according to claim 6, wherein the first pixel electrode and the second pixel electrode are formed of reflective conductive films.

8. A projection display comprising:
    the electro-optical device according to claim 6;
    a light source that supplies light for the electro-optical device; and
    a projection optical system that projects light modulated by the electro-optical device onto a target surface.

9. An electronic apparatus comprising the electro-optical device according to claim 1.

* * * * *